(12) United States Patent
Kotler

(10) Patent No.: US 8,770,886 B1
(45) Date of Patent: Jul. 8, 2014

(54) MODULAR FLOORING SYSTEM

(71) Applicant: Daniel Kotler, Park City, UT (US)

(72) Inventor: Daniel Kotler, Park City, UT (US)

( * ) Notice: Subject to any disclaimer, the term of this patent is extended or adjusted under 35 U.S.C. 154(b) by 0 days.

(21) Appl. No.: 13/891,686

(22) Filed: May 10, 2013

(51) Int. Cl.
| | | |
|---|---|---|
| *E01C 3/00* | (2006.01) | |
| *E01C 5/00* | (2006.01) | |
| *E01C 9/00* | (2006.01) | |
| *E01C 15/00* | (2006.01) | |
| *B32B 3/26* | (2006.01) | |

(52) U.S. Cl.
CPC ............... *B32B 3/263* (2013.01); *E01C 5/003* (2013.01); *E01C 9/008* (2013.01); *E01C 15/00* (2013.01)
USPC ................ 404/31; 404/17; 404/27; 404/28; 404/29; 404/34; 404/36; 404/72; 404/75

(58) Field of Classification Search
CPC ................................ E01C 15/00; E01C 9/008
USPC ........... 404/17–19, 27–29, 31, 34–36, 72, 75
See application file for complete search history.

(56) References Cited

U.S. PATENT DOCUMENTS

| | | | | |
|---|---|---|---|---|
| 5,363,614 A | * | 11/1994 | Faulkner | 52/263 |
| 5,549,418 A | * | 8/1996 | Devine et al. | 405/258.1 |
| 6,146,054 A | * | 11/2000 | Tessonneau | 405/258.1 |
| 6,851,236 B1 | * | 2/2005 | Harvey | 52/403.1 |
| 7,244,076 B2 | * | 7/2007 | Whitson | 404/73 |
| 8,662,787 B2 | * | 3/2014 | Sawyer et al. | 404/28 |

* cited by examiner

*Primary Examiner* — Raymond W Addie
(74) *Attorney, Agent, or Firm* — Plager Schack LLP

(57) ABSTRACT

A modular flooring system is provided to convert uneven terrain into a substantially horizontal flat surface. The modular flooring system may include a frame defining the area desired for the substantially horizontal flat surface, a plurality of malleable support members that may be used as a single layer or multiple layers, where the malleable support members may be loosely filled sand-filled bags. The system may also include a plurality of flat rigid panels larger than the malleable support members to bridge the gaps between adjacent malleable support members, thus transforming a generally level layer of malleable support members into a substantially flat flooring surface.

9 Claims, 8 Drawing Sheets

MODULAR FLOORING SYSTEM

BACKGROUND

The embodiments herein relate generally to modular flooring systems, and in particular, to a modular flooring system that may be employed to convert uneven terrain into a substantially horizontal flat activity surface. There exists a need that remains unfilled to be able to quickly create a flat surface temporarily from an existing uneven surface in a safe and stable fashion. Embodiments of the present invention satisfy that need.

SUMMARY

One embodiment of modular flooring system is configured to provide a substantially horizontal flat surface where the system may be employed on uneven terrain of varied profiles. In one example, the modular flooring system comprises a frame defining the area desired for the substantially horizontal flat surface, the frame comprising periphery members comprising lengths suitable for the desired surface area, the periphery members being joined together at one or numerous possible angles to create the desired shape of the substantially horizontal flat surface; a plurality of malleable support members, each independently malleable support members configured to be placed on top of the uneven terrain across an area commensurate with the area of the desired substantially horizontal flat surface, the malleable support members configured to be abutted against each other and, if desired, placed on top of each other, to convert the uneven terrain into a generally level surface; and a plurality of flat rigid panels configured in shape and size to be larger than at least some of the malleable support members, such that, when in use, a single flat rigid panel covers more than one malleable support member to bridge the junction between adjacent malleable support members; wherein modular flooring system is configured such that, when assembled, an uneven terrain may be converted to a stable and substantially flat surface upon which activity may take place by users in a safe manner without the hazards associated with conducting the same activity upon the uneven terrain.

In one embodiment, a modular flooring system may include malleable support members that comprise bags configured to be filled with sand sufficiently loosely to permit, when in use, forming the sand-filled bags to fit with the constraints of the uneven terrain so as to result in converting, whether with one or more layers of malleable support members, the uneven terrain into a generally level surface. Preferably, although not necessarily, the frame comprises material that is resistant to weathering and the effects of exposure in an outdoor environment to terrain of varied materials.

Methods are also provided by the invention herein of converting uneven terrain of varied profiles into a substantially horizontal flat surface for the safe use of the surface for activities thereon. In one application, one example of a method comprises placing a plurality of malleable support members on the uneven terrain and adjusting both the size and shape of the malleable support members to abut against each other, and on top of each other if necessary, to create a generally level surface across the top of the plurality of malleable support members; placing a frame defining the area desired for the substantially horizontal flat surface on the generally level surface created by the malleable support members or onto a generally flat surface immediately surrounding the plurality of malleable support members, the frame comprising periphery members comprising lengths suitable for the desired surface area, the periphery members being joined together at one or numerous possible angles to create the desired shape of the substantially horizontal flat surface; and placing a plurality of flat rigid panels configured in shape and size to be larger than at least some of the malleable support members, such that, the single flat rigid panels cover more than one malleable support member to bridge the junctions between adjacent malleable support members; wherein when completed the modular flooring system results in converting an uneven terrain into a stable and substantially flat surface upon which activity may take place by users in a safe manner without the hazards associated with conducting the same activity upon the uneven terrain.

The converting method may be such that the malleable support members comprise bags configured to be filled with sand sufficiently loosely to permit, when in use, forming the sand-filled bags to fit with the constraints of the uneven terrain so as to result in converting, whether with one or more layers of malleable support members, the uneven terrain into a generally level surface. Such methods may therefore further comprise filling the bags with sand. In other applications, the frame may be placed such that the top of the frame is flush with the generally level surface created by the plurality of malleable support members such that placing the plurality of flat rigid panels comprises covering both the plurality of flat rigid panels and the top of the frame. A plurality border panels, or a single monolithic border panel, may be employed on top of the frame and around the periphery of the plurality of flat rigid panels to complete the substantially horizontal flat surface.

BRIEF DESCRIPTION OF THE FIGURES

The detailed description of some embodiments of the invention will be is made below with reference to the accompanying figures, wherein like numerals represent corresponding parts of the figures.

DETAILED DESCRIPTION OF CERTAIN EMBODIMENTS

Figure 1A:
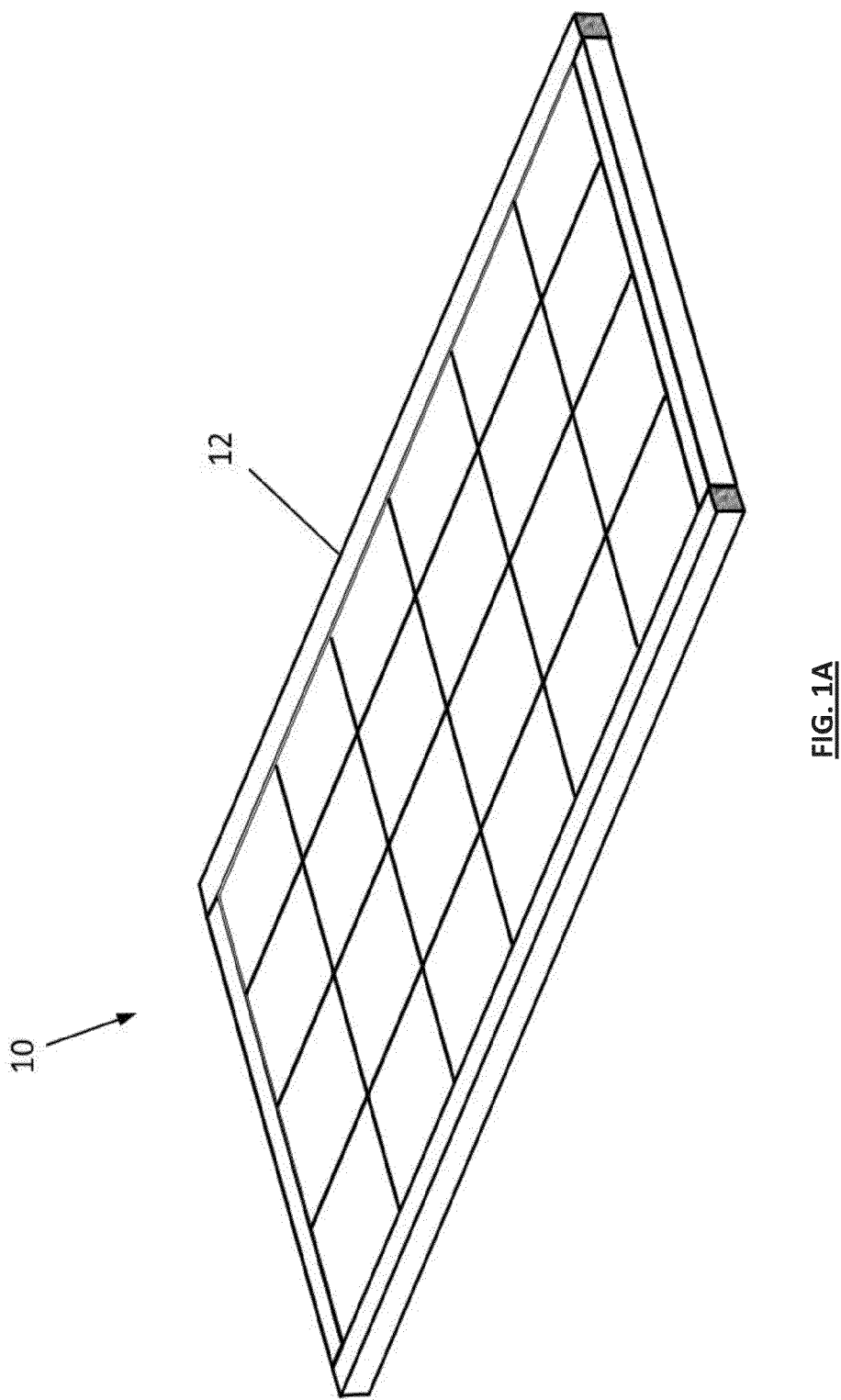
FIGS. 1A through 1C show a schematic perspective view of one embodiment of the present inventive modular flooring system.
Figure 1B:
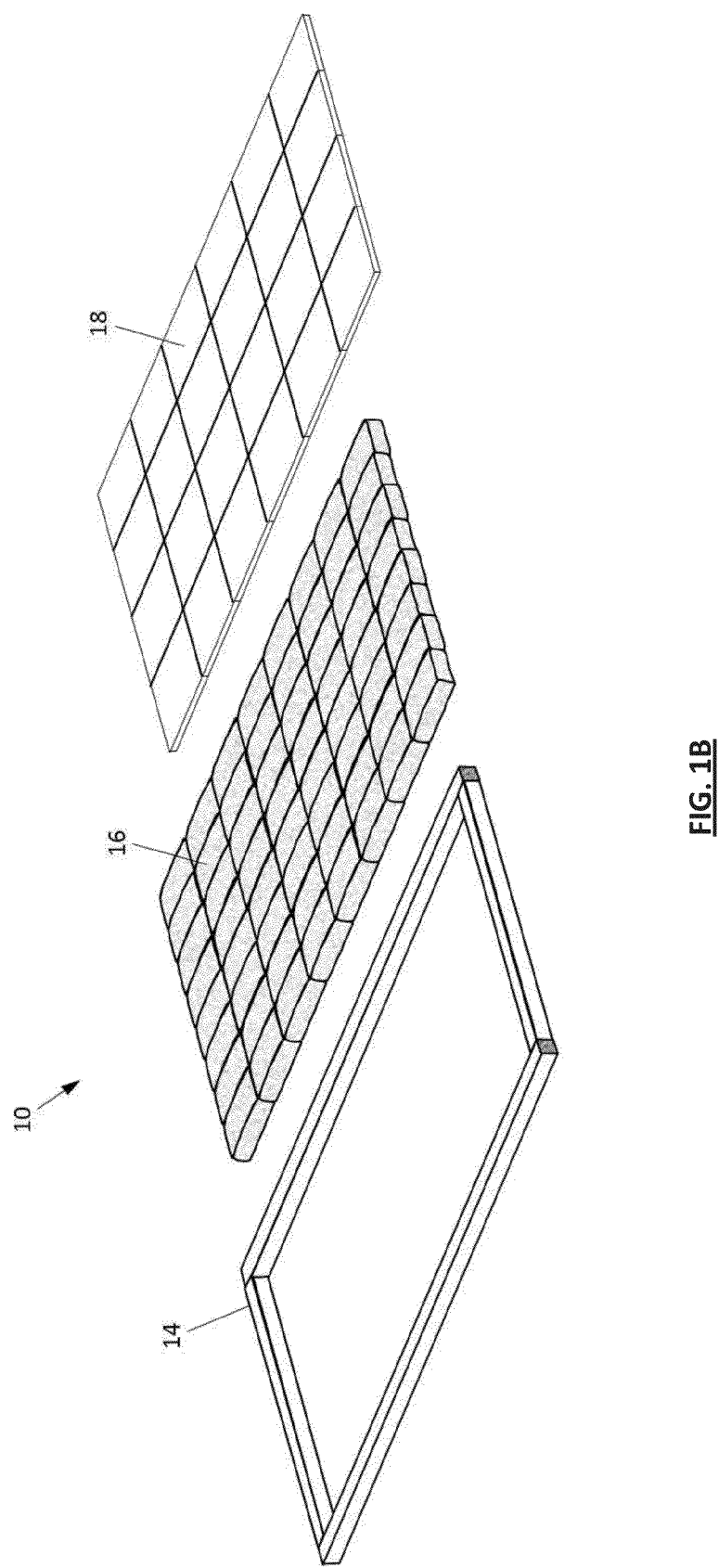

By way of example, and referring to FIGS. 1A and 1B, one embodiment 10 of the present system comprises a modular flooring system 12 comprising a frame 14, a plurality of malleable support members 16, and a plurality of flat rigid panels 18. In the embodiment of FIGS. 1A and 1B, the flooring system 12 has a generally rectangular geometry. But this is by example only, as the components of the system 12 may comprise one of infinite shapes and sizes. In that regard, frame 14 comprises a plurality of peripheral members that can be assembled to form the outline of the desired floor area. In one embodiment, frame 14 may comprise a wooden assembly of 2×4's or wooden members of different cross-section. Where a quadrilateral shape is desired, four such peripheral members may be employed. Where a multi-faceted periphery is desired, such as a pentagon or a shape with more sides or irregular sides, the plurality of peripheral members may be assembled to create the outer shape of the floor. Indeed, even circular or ovoid shapes may be used if so desired, where the peripheral members may comprise materials that are pre-cast or may be molded to form the periphery. Even a large number of small members may be joined together to form a curvilinear periphery without the need for arcuate members. Materials other than wood may be employed, including synthetic materials employed today that withstand weather- and ground-related decay and/or destruction with time.

Figure 1C:
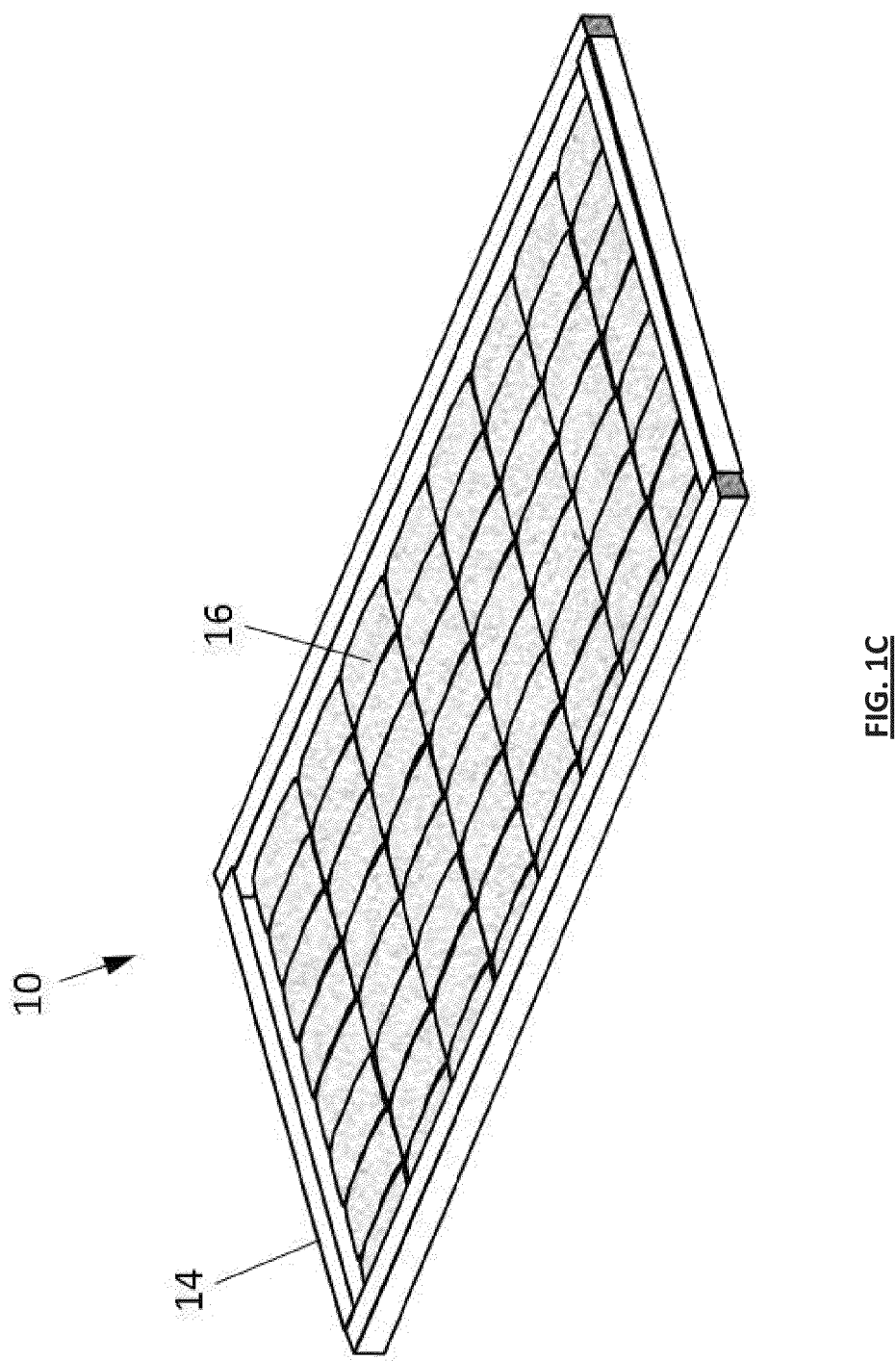

As may be appreciated from FIG. 1C, embodiment 10 may be constructed by either first placing the frame 14 on a surface that is generally flat along its periphery, even if the terrain within and without the area bounded by the frame 14 is not level. For example, the area within the periphery of frame 14 may have a concave profile, or simply be pock-marked with numerous small hills and valleys that would preclude a single large floor to be applied stably. To overcome the non-level surface that may exist within the bounds of frame 14, the plurality of malleable support member are placed within the frame and molded to fill the valleys and rest on the hills in a manner where the top of the "layer" of malleable support members presents a generally level surface.

In one embodiment, the malleable support members may comprises sand-filled bags, where the bags are loosely filled to permit a user to form each member in one of a number of shapes suited to adapt to the uneven terrain and yet level a top surface that is general level. Where the valleys are fairly deep, more than one such malleable support member may be used, where as in the areas comprising hills, a single member may be placed fairly thinly to lie flush with an adjacent member that is used to more robustly fill a valley. In other embodiments, the malleable support members may comprise bags filled with other loose material such as pea gravel or the like, or may indeed comprise a monolithic material that is sufficiently firm to bear some of a distributed weight while being formable into various shapes, such as clay or other similar materials.

As may be appreciated by referring to FIG. 1A, once the malleable support members have transformed the uneven terrain into a generally level surface, the plurality of rigid panels 18, which are preferably larger than the plurality of malleable support members, may be placed on top of the malleable support members within the frame 14. By providing the rigid panels with a size larger than the malleable support members, the junction of abutting malleable support members is bridged by the rigid support member, transforming the generally level surface into a substantially flat floor.

Figure 3A:
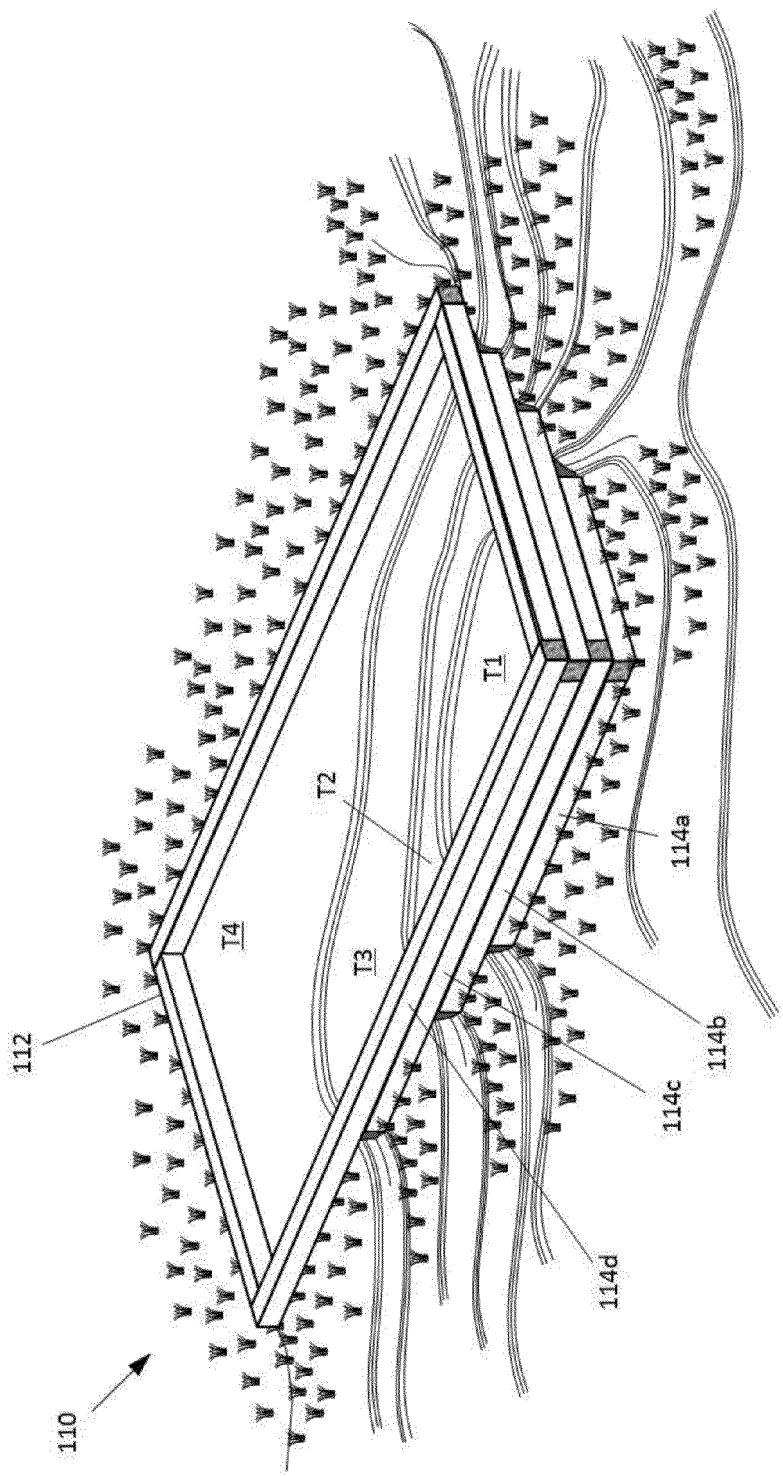
FIGS. 3A through 3D show a schematic perspective view of yet another embodiment of the present inventive modular flooring system.

By comparing FIGS. 1A and 3A, at least some of the variations in embodiments may be appreciated. In that regard, where a flat flooring surface is desired to be placed upon terrain that is substantially non-level, not only with hills and valleys, but with slopes of varying degrees and gradients, a multi-tiered flooring system may be used. Embodiment 110 comprises a system 112 comprising a plurality of frame levels 114a, 114b, 114c and 114d, by example only. The lower frame levels 114a, 114b and 114c may be sized to accommodate the general size of a multi-tiered terrain, where frame level 114a may be placed on generally level first tier T1, frame level 114b may be placed on generally level second tier T2, and frame level 114c may be placed on generally level third tier T3. What can be appreciated is that the number of tiers and the arrangement of the frame levels is sufficiently variable to accommodate an infinite array of non-level sloped surfaces.

Figure 3B:
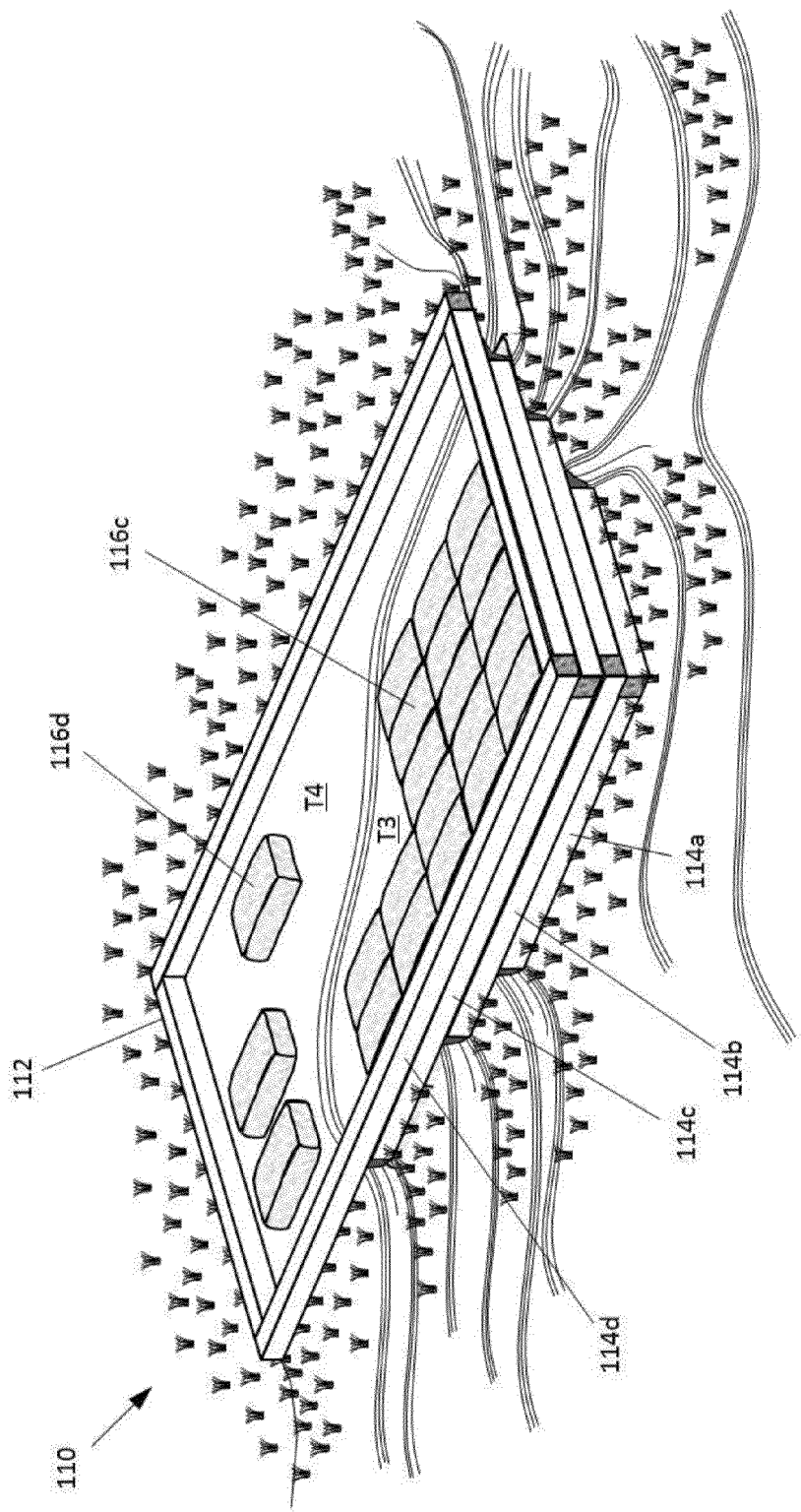
Figure 3C:
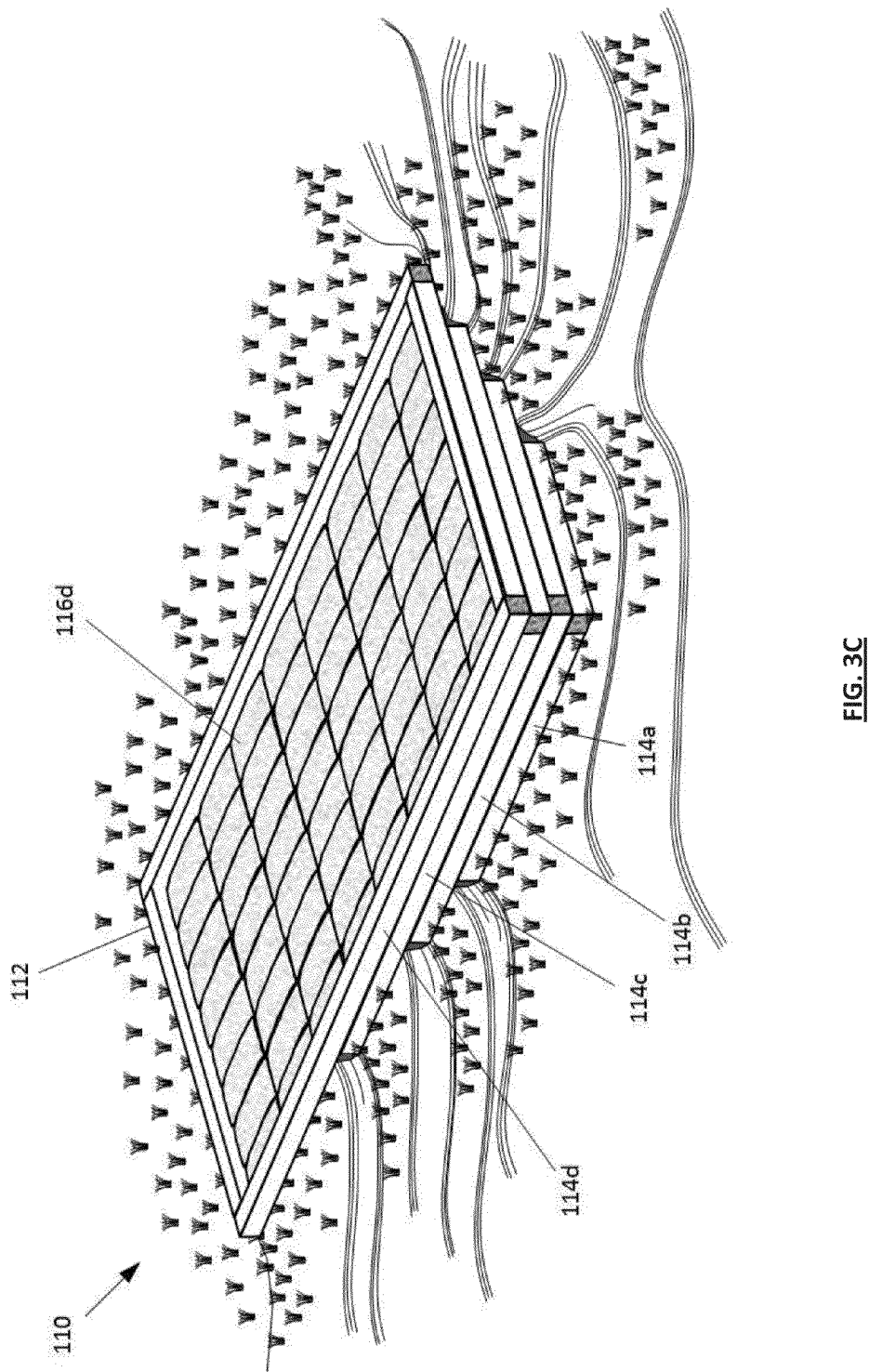
Figure 3D:
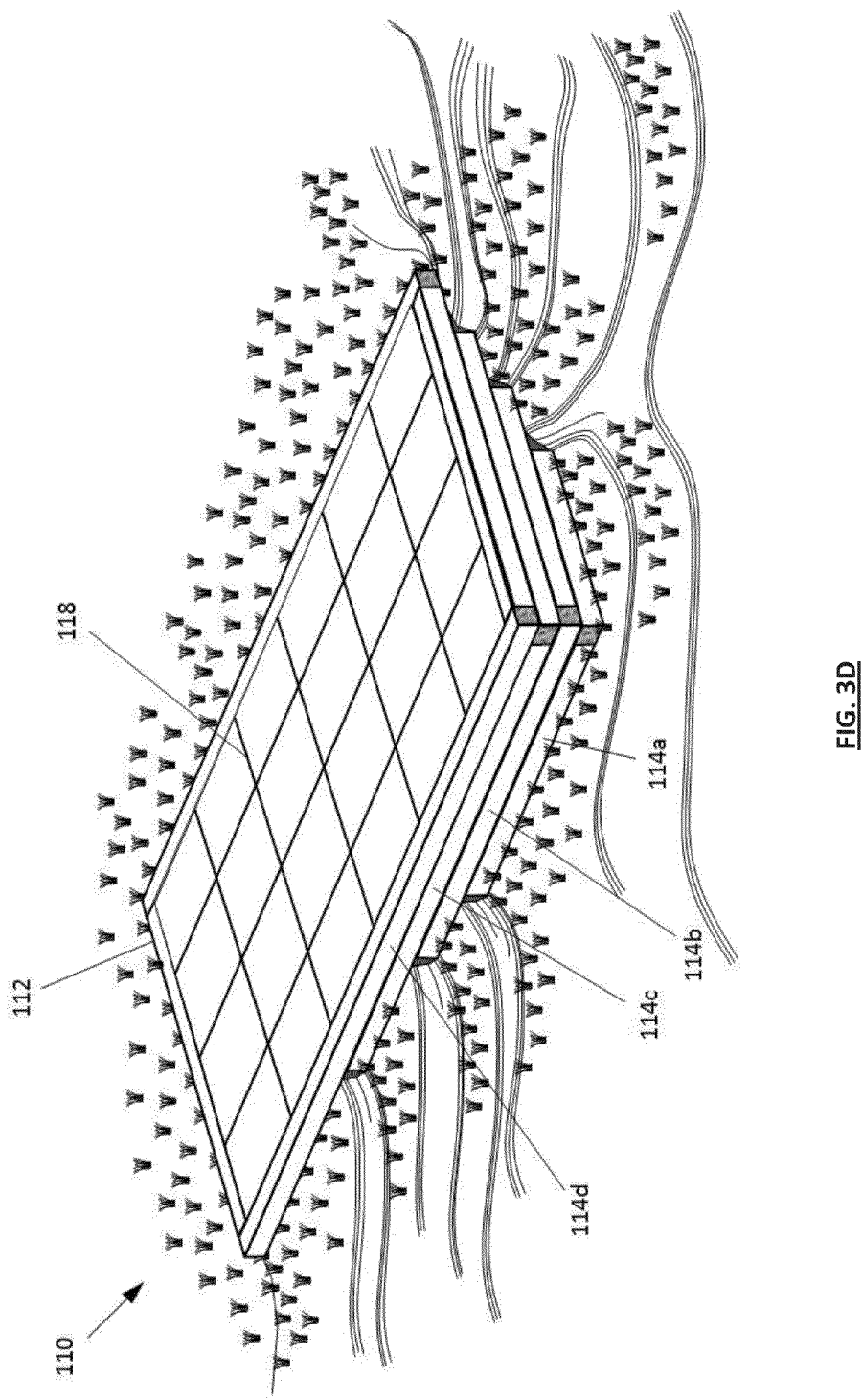

By enclosing a first tier T1 with its natural ground border along one side and frame level 114a to complete the periphery, a first layer of malleable support members 116a (not shown) may be placed, followed by a second layer of malleable support members 116b within frame level 114b, and a third layer of malleable support members 116c within frame level 114c, as shown in FIG. 3B. Completion of the system 112 may be accomplished by finishing with a final layer of malleable support members 116d with frame level 114d to result in a generally level surface as shown in FIG. 116d. Upon applying a plurality of rigid panel members 118, a substantially flat flooring system 112 is now complete, as shown in FIG. 3D. There is no requirement that the frame levels be flush with each other along the sides, as lower frame level 114a may extend outwardly from frame level 114b if desired. Indeed, any of the frames illustrated and described herein may be placed upon a generally level terrain or upon a generally level layer of malleable support members, if necessary to accommodate a more gradually sloped terrace. The interface of layers of support members with peripheral members of frame levels provides a wide variety of configurations and arrangements for transforming non-level terrain into substantially flat flooring.

Figure 2A:
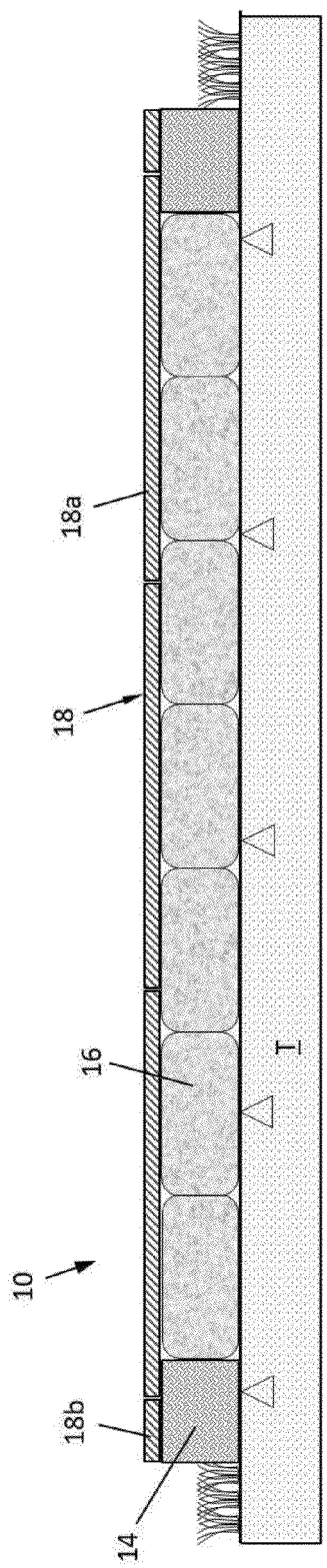
FIG. 2A shows an elevational schematic of the embodiment of FIG. 1A.
Figure 2B:
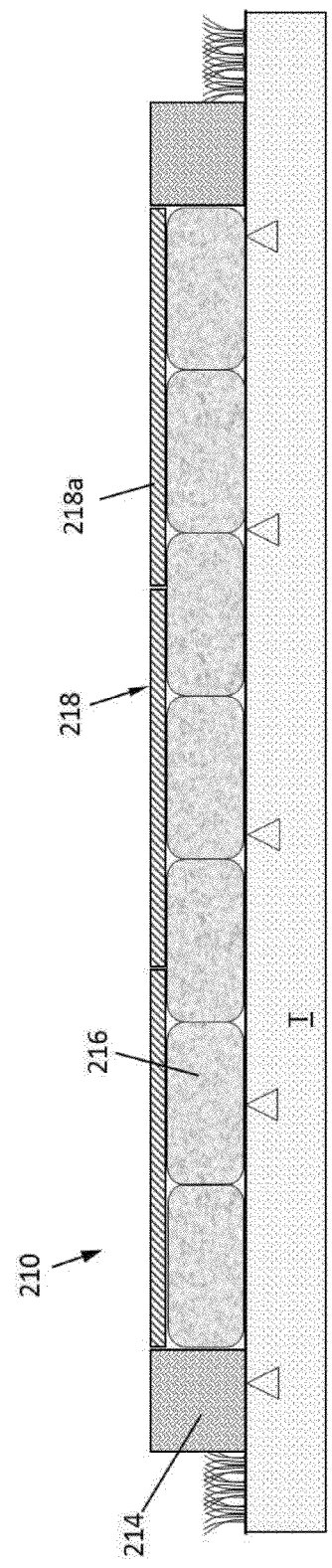
FIG. 2B shows an elevational schematic of an alternative embodiment of flooring system.

Referring to FIGS. 2A and 2B, by example only, it may be appreciated that the plurality of rigid panels need not fit only within the periphery of the frame, as shown in embodiment 10 of FIG. 2A, but be placed flush with the top of the frame's peripheral members, as shown with embodiment 210 of FIG. 2B. In the latter embodiment, for example, embodiment 210 comprises frame 214 encircling a plurality of malleable support members 216. With embodiment 10 of FIG. 2A, the top layer of malleable support members 16 is flush with the top of the peripheral members of frame 14. In contrast, with embodiment 210 of FIG. 2B, the top layer of malleable support members 216 is below the top of the peripheral members of frame 214, such that when the rigid panels 218 are placed upon the top layer of malleable support members 216, the rigid panels 218 sit flush with the top of the peripheral members of frame 214. Where such a configuration is used, for example, the frame 214 defines the end of the substantially flat floor. Where a configuration is used, for example, such as that shown in FIG. 2A, a first set of rigid panel members 18a may be used on top of the top layer of malleable support members 16 to bring the gap between the malleable support members 16 and the peripheral members of the frame. To complete the flooring, if so desired, a second set of rigid panel members 18b may be employed to bring the flooring up to the far edges of the peripheral members of the frame 14. Of course, numerous variations on this concept may be employed.

With reference to FIGS. 2A and 2B, regardless of how the modular components are arranged, embodiments of the present invention benefit from providing rigid panels larger than the malleable support members, and preferably significantly larger, to bring the joints between the malleable support members and to transform the general level surface exposed by the top layer of malleable support members (or single layer where the terrain is not significantly out of level) into a substantially flat flooring surface. At least another benefit is its modularity, in that the system may be assembled and disassembled fairly easily, and can be used to create flat flooring of any size or configuration. Thus, the terrain can be left without having been disturbed. Moreover, the configurations contemplated herein permit draining to occur through the flooring systems as well.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A modular flooring system configured to provide a substantially horizontal flat surface where the system may be employed on uneven terrain of varied profiles, the modular flooring system comprising:

a frame defining the area desired for the substantially horizontal flat surface, the frame comprising periphery members comprising lengths suitable for the desired surface area, the periphery members being joined together at one or numerous possible angles to create the desired shape of the substantially horizontal flat surface;

a plurality of malleable support members, each independently malleable support members configured to be placed on top of the uneven terrain across an area commensurate with the area of the desired substantially horizontal flat surface, the malleable support members configured to be abutted against each other and, if desired, placed on top of each other, to convert the uneven terrain into a generally level surface;

wherein each malleable support member comprises a flexible container and a loose fill material and a plurality of flat rigid panels configured in shape and size to be larger than at least some of the malleable support members, such that, when in use, a single flat rigid panel covers more than one malleable support member to bridge the junction between adjacent malleable support members;

wherein modular flooring system is configured such that, when assembled, an uneven terrain may be converted to a stable and substantially flat surface upon which activity may take place by users in a safe manner without the hazards associated with conducting the same activity upon the uneven terrain.

2. The modular flooring system of claim 1, wherein the malleable support members comprise bags configured to be filled with sand sufficiently loosely to permit, when in use, forming the sand-filled bags to fit with the constraints of the uneven terrain so as to result in converting, whether with one or more layers of malleable support members, the uneven terrain into a generally level surface.

3. The modular flooring system of claim 2, wherein the frame comprises material that is resistant to weathering and the effects of exposure in an outdoor environment to terrain of varied materials.

4. The modular flooring system of claim 1, further comprising a periphery panel configured to be placed on top of the frame, the periphery panel comprising a size and shape commensurate with the periphery of the frame.

5. A method of converting uneven terrain of varied profiles into a substantially horizontal flat surface for the safe use of the surface for activities thereon, the converting method comprising:

placing a plurality of malleable support members on the uneven terrain and adjusting both the size and shape of the malleable support members to abut against each other, and on top of each other if necessary, to create a generally level surface across the top of the plurality of malleable support members;

wherein each malleable support member comprises a flexible container and a loose fill material;

placing a frame defining the area desired for the substantially horizontal flat surface on the generally level surface created by the malleable support members or onto a generally flat surface immediately surrounding the plurality of malleable support members, the frame comprising periphery members comprising lengths suitable for the desired surface area, the periphery members being joined together at one or numerous possible angles to create the desired shape of the substantially horizontal flat surface; and placing a plurality of flat rigid panels configured in shape and size to be larger than at least some of the malleable support members, such that, the single flat rigid panels cover more than one malleable support member to bridge the junctions between adjacent malleable support members;

wherein when completed the modular flooring system results in converting an uneven terrain into a stable and substantially flat surface upon which activity may take place by users in a safe manner without the hazards associated with conducting the same activity upon the uneven terrain.

6. The converting method of claim 5, wherein the malleable support members comprise bags configured to be filled with sand sufficiently loosely to permit, when in use, forming the sand-filled bags to fit with the constraints of the uneven terrain so as to result in converting, whether with one or more layers of malleable support members, the uneven terrain into a generally level surface.

7. The converting method of claim 6, further comprising filling the bags with sand.

8. The converting method of claim 5, wherein the frame is placed such that the top of the frame is flush with the generally level surface created by the plurality of malleable support members such that placing the plurality of flat rigid panels comprises covering both the plurality of flat rigid panels and the top of the frame.

9. The converting method of claim 8, further comprising placing a border panel on top of the frame and around the periphery of the plurality of flat rigid panels to complete the substantially horizontal flat surface.

* * * * *